No. 730,278. Patented June 9, 1903.

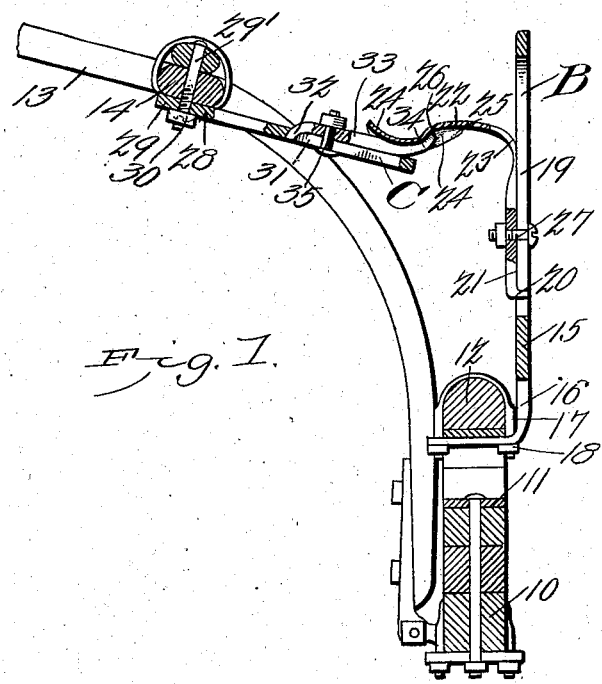

UNITED STATES PATENT OFFICE.

SAMUEL A. LIVINGSTONE AND WILL F. BENNETT, OF HAMMOND, INDIANA.

SHAFT-SUPPORT.

SPECIFICATION forming part of Letters Patent No. 730,278, dated June 9, 1903.

Application filed February 9, 1903. Serial No. 142,621. (No model.)

*To all whom it may concern:*

Be it known that we, SAMUEL A. LIVINGSTONE and WILL F. BENNETT, citizens of the United States, residing at Hammond, in the county of Lake and State of Indiana, have invented a new and useful Shaft-Support, of which the following is a specification.

Our invention relates to supports for the shafts of vehicles, and has for its object the provision of a simple and effective device of this class.

In the accompanying drawings, Figure 1 is a broken side elevation of the axle, shafts, and more closely-associated parts of a wagon to which is applied one embodiment of our invention. Fig. 2 is a perspective view of the member thereof carried by the axle, and Fig. 3 is a similar view of the coacting member carried by the shafts.

Similar characters indicate like parts throughout the several figures of the drawings.

The numeral 10 designates the axle of a wagon, carrying in the usual manner the spring 11 and bolster 12, and to which is attached the shafts 13, with their cross-bar 14.

The members B and C of our improved support are here shown as secured, respectively, to the bolster and spring and to the cross-bar. The former has a standard 15, provided with separated arms 16 16, which are flattened and bent at substantially right angles to the standards. These arms are adapted to be placed below and in contact with the upper portion of the spring and be secured thereto, with the standard extending substantially vertically, by clips 17 17, passing over the bolster and having their threaded ends extending through openings in the arm and being engaged by nuts 18. The standard is preferably slotted longitudinally at 19, and through this slot extends a projection 20 from an engaging device 21, contacting with the outer face of the standard and having a forward extension 22 connected to it by an intermediate spring portion 23. The extension 22 is preferably formed with an upwardly-curved lip 24, from each side of which depend flanges 25 25, having between them a recess 26. A bolt 27, passing through the device 21 and slot 19, adjustably retains the former in position on the standard, the projection 20 preventing its turning thereon. The other member C may have a T-shaped support 28, of which the head 29 lies beneath the cross-bar 14 and is secured in place by the whiffletree-bolt 29 and screws 30 30. It is preferably slotted at 31 to receive a projection 32 from an engaging device 33 for coaction with the part 21, previously described. An upturned end or nose 34 upon the element 33 is so located as to pass under the lip 24 and enter the recess 26. A bolt 35, in connection with the projection 32, retains the device in position, permitting adjustment longitudinally of the shafts.

The operation of the invention can be readily understood. When it is desired to support the shafts in a raised position, they are pushed upward until the nose 34 contacts with the lip 24, which by virtue of the connecting spring portion 23 is forced up until it reaches the recess 26, into which it snaps and is retained in place. Too great upward movement may be prevented by contact of the end of the lip with the bolt 35 or its nut and lateral movement and consequent disengagement by the side flanges 25. When it is desired to lower the shaft, a sharp pull readily separates the engaging devices. The firmness with which these members engage one another may be varied by the adjustment of either of them along their slots, and by altering the position of both devices the height at which the shafts are held may be changed.

Having thus described our invention, we claim—

1. A shaft-support comprising members provided with means for attachment respectively to a vehicle and its shafts, and respectively carrying separable interlocking elements, one of said elements being adjustable transversely of the other to vary the firmness of the interlocking engagement, and the other element being adjustable longitudinally of the first-named element to vary the elevation at which the shafts are supported.

2. A shaft-support comprising members provided with means for attachment respectively to a vehicle and its shafts and respectively carrying separable interlocking elements, one of said elements having a recess with a longitudinally-disposed flange arranged at each side thereof, and the other element provided with a projection adapted to enter between the flanges and engage the recess of the first-named element.

3. A shaft-support comprising members provided with means for attachment respectively to a vehicle and its shafts, and respectively carrying separable interlocking elements, one of said elements being adjustable transversely of the other to vary the firmness of the interlocking engagement and having a recess with a depending longitudinally-disposed flange arranged at each side thereof, and the other element being adjustable longitudinally of the first-named element to vary the elevation at which the shafts are supported and provided with an upturned projection adapted to enter between said flanges and engage the recess.

4. In a shaft-support, the combination with a standard adapted for attachment to a vehicle, of an engaging device carried by the standards and provided with a spring portion and a recess, a member adapted for attachment to the shafts, and an engaging device carried by said member and having a projection for engaging the recess.

5. In a shaft-support, the combination with a slotted standard adapted for attachment to a vehicle, of a device adjustable along the standard-slot and provided with a recess, a slotted member adapted for attachment to the shafts, and an engaging device adjustable along the member slot and having a projection for engaging the recess.

In testimony that we claim the foregoing as our own we have hereto affixed our signatures in the presence of two witnesses.

SAMUEL A. LIVINGSTONE.
  WILL F. BENNETT.

Witnesses:
 JOHN T. CLARK,
 EDD J. KEEFEN.